United States Patent [19]

Rappas et al.

[11] 4,097,272
[45] Jun. 27, 1978

[54] WINNING NICKEL AND COBALT WITH MERCAPTIDE EXTRACTANTS AND CARBON MONOXIDE STRIP

[75] Inventors: Alkis S. Rappas, Bedford; J. Paul Pemsler, Lexington, both of Mass.

[73] Assignee: Kennecott Copper Corporation, New York, N.Y.

[21] Appl. No.: 831,502

[22] Filed: Sep. 8, 1977

[51] Int. Cl.$^2$ .................. C22B 23/04; C01G 51/02; C01G 53/02; C07C 149/00
[52] U.S. Cl. ........................... 75/119; 75/101 BE; 423/139; 423/149; 423/418; 260/439 R; 260/609 R
[58] Field of Search ............... 423/139, 149, 417, 418, 423/658.5, 140; 75/101 BE, 119; 260/439 R, 609 R, 561 S, 562 S, 583 EE

[56] References Cited

U.S. PATENT DOCUMENTS

| | | | |
|---|---|---|---|
| 2,296,306 | 9/1942 | Peterson | 95/6 |
| 2,412,700 | 12/1946 | Weissberger et al. | 260/562 S |
| 2,964,387 | 12/1960 | Podall et al. | 423/418 |
| 3,369,876 | 2/1968 | Grimm | 260/439 R |
| 3,663,624 | 5/1972 | Jones | 260/609 R |
| 3,728,104 | 4/1973 | Coffield | 75/101 BE |
| 3,755,161 | 8/1973 | Yokota | 75/101 BE |
| 3,967,958 | 7/1976 | Coffield et al. | 75/119 |

OTHER PUBLICATIONS

Swan, C. et al. "Complexes of Co, Ni, Th, Pd with Some Mercapto Compounds" *Chemistry and Industry* 8/12/67 pp. 1353, 1364.

Mehrota, R. et al. "Thiol and Thio–B–Diketone Derivatives of Some Elements" *Inorganica Chemica Acta, Reviews* (1968), pp. 111–121.

*Primary Examiner*—O. R. Vertiz
*Assistant Examiner*—Brian E. Hearn
*Attorney, Agent, or Firm*—John L. Sniado; Anthony M. Lorusso

[57] ABSTRACT

A novel process for extracting, concentrating, and isolating nickel and cobalt from aqueous solution thereof. A cobalt and/or nickel bearing solution is contacted with an extractant comprising a substantially water immiscible organic solvent containing solubilized mercaptide anion to form water insoluble cobalt and nickel mercaptides in the organic phase. The organic phase is then separated from the raffinate and contacted with an alkaline solution and carbon monoxide to produce nickel and cobalt carbonyl compounds. Typically, the nickel carbonyl produced is gaseous $Ni(CO)_4$ which may be easily isolated by known methods from other components in the off-gas stream. Pure nickel metal is then obtained from the nickel tetracarbonyl by known methods. The cobalt carbonyl compound produced is typically water soluble carbonyl cobaltate ion, $Co(CO)_4^-$, which may be oxidized to form water insoluble cobalt carbonyl compounds. The stripped extractant, the cobalt and nickel-free raffinate, and the carbon monoxide from the decomposition of carbonyl may be recycled.

18 Claims, 3 Drawing Figures

WINNING NICKEL AND COBALT WITH MERCAPTIDE EXTRACTANTS AND CARBON MONOXIDE STRIP

BACKGROUND OF THE INVENTION

This invention relates to a process for recovering cobalt and nickel from aqueous solutions thereof and is particularly well adapted for use with dilute and/or ammoniacal cobalt and nickel bearing solutions.

It is known that nickel can be recovered from its concentrated acidic solutions by electrowinning. However, if the nickel solution is ammoniacal, or if the solution is too dilute, then the nickel ions must be extracted by liquid ion exchange and back extracted into a sulfuric acid solution before being electrowon. The purity of the nickel obtained from such a process is very sensitive to the nature and concentration of the impurities present in the solution.

It is also known that nickel can be obtained from its solutions by hydrogen reduction at elevated temperatures and pressures. Typically, nickel won by this method is very impure.

Because of the diffulties of the foregoing nickel recovery processes, carbonylation processes for recoverig nickel and cobalt have recently been developed. In the carbonylation process, very pure nickel and cobalt of acceptable purity are obtained by treating nickel and cobalt values to produce carbonyl compounds. The gaseous compound $Ni(CO)_4$ is then isolated and thermally decomposed to yield pure metal pellets and carbon monoxide gas. The purity of the nickel metal produced by this process is excellent because of the selectivity of the carbonylation reaction and the fact that other metals often present with nickel do not form gaseous compounds.

There are many known methods for producing nickel tetracarbonyl from metallic nickel as well as from thermally unstable or reducible nickel compounds such as oxides, formates, acetates, or oxalates. However, at present, nickel tetracarbonyl can be produced in aqueous media only under extreme condition, that is, in strongly alkaline solutions, at high temperatures and pressures, and/or with the aid of certain catalysts. For example, in U.S. Pat. No. 3,804,614 to Coffield et al., nickel is produced from ammoniacal slurries of nickel sulfide by reaction with carbon monoxide in the presence of cyanide ion. U.S. Pat. No. 3,775,099 to Coffield et al., in addition to cyanide, discloses that sulfide, cysteine, and tartrate ligands promote nickel carbonylation. U.S. Pat. No. 3,658,475 to O'Neill et al. discloses another carbonylation procedure. However, in practical application, all of the foregoing methods require temperatures above 100° C and CO pressures on the order of 30 or more atmospheres. Thus, in order to produce nickel tetracarbonyl, the carbonylation must be carried out in expensive autoclaves.

Known procedures for obtaining cobalt carbonyl compounds, in general, are characterized by the same drawbacks as those set forth above. The product of carbonylation of cobalt values is typically water soluble carbonyl cobaltate ion, $Co(CO)_4^-$. Oxidation of aqueous solutions of carbonyl cobaltate produces water insoluble carbonyl compounds such as $Co_2(CO)_8$, $Co_4(CO)_{12}$ etc. These compounds may be easily reduced to cobalt metal (see, U.S. Pat. No. 3,728,104 to Coffield), but are also valuable per se as organic reaction catalysts and the like.

SUMMARY OF THE INVENTION

It has now been discovered that water insoluble mercaptide anions in water immiscible organic solvents can act as extractants for removing cobalt and nickel values from aqueous solutions. Such extractants have been found to be capable of essentially quantitatively removing solubilized cobalt and nickel values contained in even dilute solutions and have been observed to have particular utility in ammoniacal solutions. Furthermore, it has been discovered that the nickel and cobalt mercaptides present in the resulting loaded extractant solution may be stripped of cobalt and nickel at or close to ambient temperature and pressure by being contacted with carbon monoxide gas and an aqueous alkaline solution. The carbonylate stripping process produces gaseous nickel tetracarbonyl and water soluble carbonyl cobaltate ions, both of which are readily converted by known methods to pure metal.

The foregoing discoveries, and others which will be hereinafter disclosed, enable the design of a cobalt and nickel winning process which can produce nickel metal of high purity and cobalt metal of acceptable purity from an aqueous solution containing a mixture of cobalt and nickel ions. The process is characterized by the steps of providing an extractant comprising a water immiscible organic solvent containing solubilized mercaptide anion capable of reacting with cobalt and nickel to form water insoluble mercaptides, contacting the extractant with an aqueous nickel and/or cobalt containing solution to produce water insoluble cobalt and/or nickel mercaptide, separating the aqueous and organic phases, contacting the loaded organic phase with an aqueous alkaline solution and carbon monoxide to produce nickel and cobalt carbonyl compounds, and then separating the compounds from the solutions.

Because the organic mercaptide extractant removes cobalt and nickel values from the aqueous solution essentially quantitatively, it is possible to recycle the metal-free, typically ammoniacal raffinate. It is also possible to recycle the organic extractant after carbonylate stripping. In this regard, less than quantitative stripping has been found to be tolerable since the extractant solution is capable of being reloaded by difference. Furthermore, carbon monoxide resulting from the conversion of the metal carbonyl compounds to metal may be recycled to the carbonylate stripping of the metal loaded organic extractant.

Regarding the scope of the invention, it should be noted that the process has particular utility with ammoniacal solutions, but that metal values of interest may be extracted from other types of solutions, e.g., nickel sulfate solutions. The ability of mercaptide anion in a water immiscible solvent system to extract nickel and cobalt has been observed to be a general phenomenon not limited to particular species of mercaptide anion. However, in order to be effective as an extractant, it is necessary that the anion be solvated in the organic solvent and that the nickel and/or cobalt mercaptide produced by substantially water insoluble. While, as disclosed herein, several suitable extractants have been prepared, further improvement by way of more favorable kinetics, ease of phase separation, and susceptibility to carbonylate stripping are possible in this area and will render the process of the invention even more economically attractive.

As noted above, in preferred embodiments of the process the organic extractant is recycled to treat additional batches of nickel and/or cobalt. In this regard, the recycled mercaptide anion will have an associated cation, e.g., $Na^+$ or $K^+$, from the alkaline soluton used in the stripping process. In some mercaptide anion extractants, these cations are necessary in order to assure the presence of the anion in organic solution, and during the extraction, the alkali metal cations are exchanged for Ni or Co and lost to the raffinate. However, other types of mercaptide anion extractants need not be in sodium or potassium form to be effective, and with these, the alkali metal ions may be removed and replaced by hydrogen ion prior to reintroduction to the extraction step. The preferred method of exchanging hydrogen for alkali metal ions is to treat the stripped extractant with carbon dioxide and water. This pre-extraction ion exchange technique has the advantage of conserving alkali, since the $Na_2CO_3$, $NaHCO_3$, $K_2CO_3$, etc. produced as a by-product may be readily converted to KOH or NaOH by treatment with CaO.

In another embodiment of the process, the carbonylation is effected in the presence of $Ca(OH)_2$ instead of NaOH or KOH. This treatment results in a mercaptan as a product of reaction, and as indicated above, in some types of mercaptide anion extractants, the mercaptan is effective to generate the desired solubilized mercaptide anion in the organic phase.

In still another aspect of the process of the invention, it has been discovered that the disulfides inevitably produced from mercaptide ion by oxidative side reactions can be regenerated so that mercaptide anion is conserved. This reaction involves a reduction of disulfide to mercaptide and may be conveniently effected by exposing the disulfide to carbon monoxide and an aqueous alkaline solution, either in the same reactor where the carbonylate stripping takes place or in a separate reactor.

Accordingly, it is an object of the invention to form nickel and cobalt carbonyl compounds from aqueous solutions of nickel and cobalt without the need of high temperatures and pressures, thus obviating the need for the use of autoclaves.

Another object of the invention is to provide a method of extracting cobalt and nickel from ammoniacal solutions thereof, which method can produce pure nickel and cobalt metal or cobalt carbonyl compounds.

Yet another object of the invention is to provide a nickel and cobalt carbonylation type recovery system which is characterized by reduced capital costs.

Another object of the invention is to provide a cobalt and nickel winning process useable on a variety of dilute or concentrated solutions of metal values extracted from, for example, laterite ores or manganese nodules.

Another object is to provide a process for separating and recovering nickel from cobalt.

Yet another object of the invention is to minimize loss of mercaptide anion through oxidation to disulfide by reducing the dilsulfide with carbon monoxide in the presence of an aqueous alkaline solution.

These and other objects of the invention will be apparent to those skilled in the art from the following description of a preferred embodiment and from the drawing.

DESCRIPTION OF A PREFERRED EMBODIMENT

Figure 1:
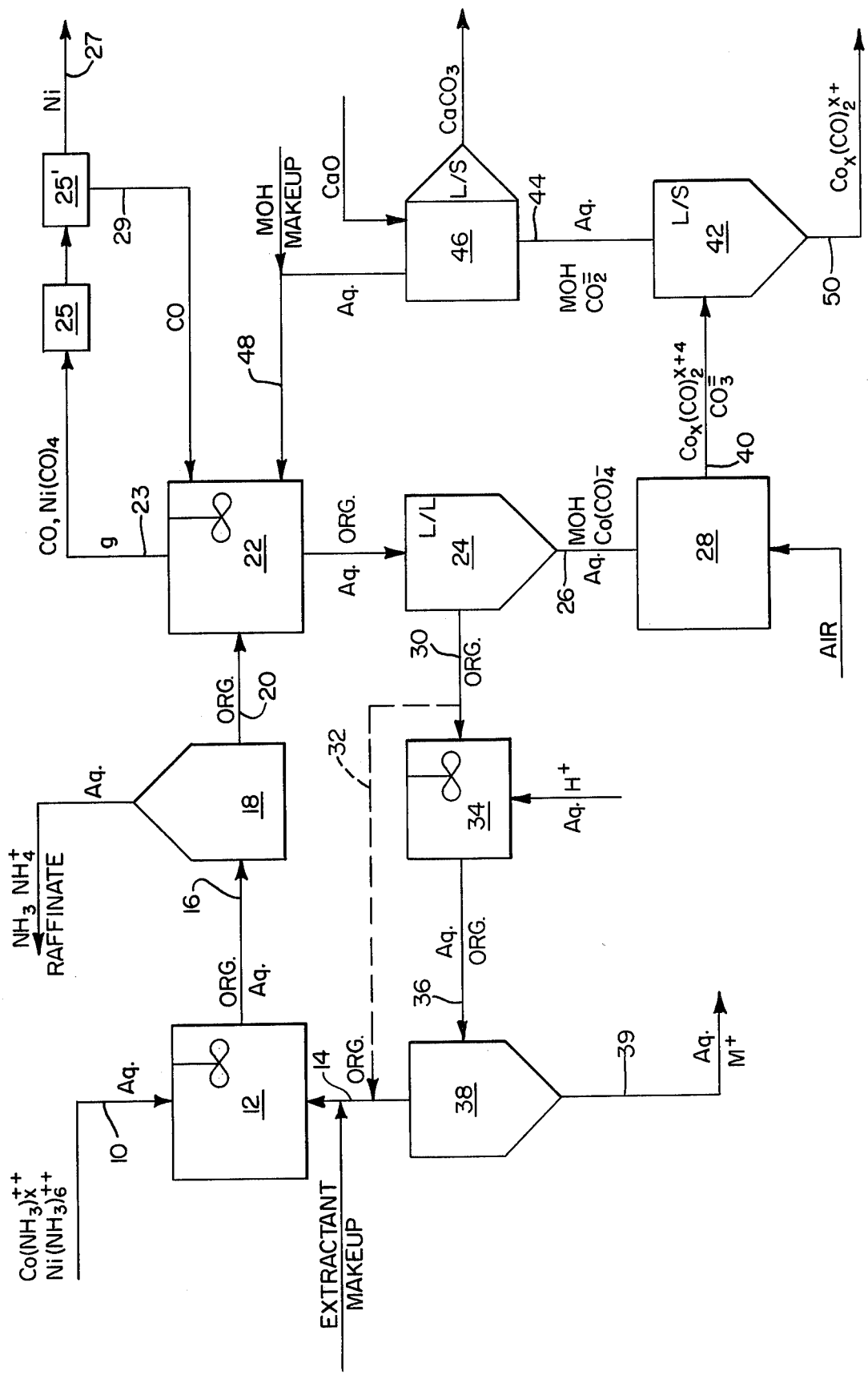
FIG. 1 is a schematic diagram illustrating an important embodiment of the process of the invention with a modification thereof in phantom.

There are many sources of aqueous nickel and cobalt containing pregnant liquors which may be treated in accordance with the instant invention. Both ammoniacal and non-ammoniacal solutions of nickel and/or cobalt carbonate, sulfate, hydroxide, etc. may be successfully utilized. The presence of solubilized iron or copper in the solution to be treated by the process of the invention is detrimental since these ions compete with cobalt and nickel in the reactions upon which the process depends. Accordingly, it is contemplated that the best results will be achieved when the processes herein disclosed are operated downstream from a copper and/or iron extraction system. In this situation, the copper and iron-free raffinate of the upstream system or systems makes an ideal liquor for use in the process of the instant invention. One particularly well suited copper removal process is disclosed in U.S. application Ser. No. 720,414, entitled Improvements in the Extraction of Copper from Solutions by Reduction with Anthraquinols, to John N. Gerlach, filed Sept. 3, 1976. This process, in addition to removing copper from the solution, utilizes hydrogen as a reducing agent. Accordingly, it is contemplated that synthesis gas could be used to drive an overall copper, cobalt and nickel winning procedure, hydrogen being used to reduce the copper, and carbon monoxide being used in accordance with the instant process to produce cobalt and nickel.

Nonlimiting examples of liquors which may be treated by the process of the invention, methods for their production, and ores from which they may be obtained are disclosed in U.S. Pat. Nos. 3,772,423 to Stevens et al.; 2,576,314 to F. A. Forward; 2,726,934 to Forward et al.; 3,088,820 to Mackiw et al.; 3,644,144 to Vosahlova, and, perhaps most notably, 3,728,105 to R. R. Skarbo, which discloses a method of extracting nickel and cobalt from deep sea manganese nodules.

The processes of the invention require a water immiscible extractant comprising an organic solvent or solvent system and solubilized mercaptide anion. It has now been discovered that, as a general phenomenon, mercaptide anion having the general formula $RS^-$ is capable of complexing with nickel and cobalt when dissolved in an organic solvent to produce organic solvent soluble $(R-S)_2Ni$ and $(R-S)_2Co$. R can be any one of an extremely large number of organic radicals. An essential property of the radical selected for R is that it render both the mercaptide anions and the resulting nickel and cobalt mercaptides soluble in the organic system selected. Thus, the mercaptide anion and the solvent system will be matched in accordance with the teachings herein disclosed to produce a homogeneous, water immiscible solution capable of removing nickel and cobalt ions from aqueous solutions and of solvating the nickel and cobalt mercaptides thereby produced.

To promote efficiency, the mercaptide ion should be highly insoluble in water, non-volatile, and free of double or triple bonds or other chemically active functional groups which might affect its stability.

The mercaptide anions suitable for use in the nickel and cobalt winning process disclosed herein should also form nickel and cobalt complexes which are easily stripped of their nickel and cobalt ions in the presence of carbon monoxide but should otherwise be inert to carbon monoxide, nickel carbonyl, or carbonyl cobaltate. An alkali metal hydroxide is required for the stripping, and the mercaptide should ideally be selected such that it may be stripped of metal values in the presence of as dilute a concentration of alkali as possible. Furthermore, the pH of the pregnant liquor to be treated will affect the decision as to which particular mercaptide anion should be selected. Obviously, any particular mercaptide anion utilized will represent a compromise among the foregoing properties.

As indicated above, the ability of the composition of matter of the invention to function as an extractant depends on the presence of mercaptide anion solubilized in the organic, water immiscible solvent. Accordingly, mercaptans and mercaptide salts, if undissociated, cannot extract cobalt and nickel values. Thus, the solvent system and the mercaptan or mercaptide salt added to the system must be selected to effect dissociation so that mercaptide anion is present. In this regard, the solvent, or at least components thereof, act as something more than a diluent or carrier as with most conventional extractants and play an important role in the invention insofar as they are selected to induce the formation of mercaptide anion and to maintain the anion concentration. At present, several general approaches to producing mercaptide anions in water immiscible organic solvents have been developed, but it is clear that further improvements in the makeup of the extractant will be possible in view of this disclosure.

In general, mercaptans are very soluble in many organic solvents such as kerosene, various hydrocarbons, aromatic solvents, etc. However, if a mercaptan (RSH) dissolved in such a solvent is mixed with a strongly alkaline aqueous solution in order to dissociate the mercaptan to give the active nickel and cobalt extractant (RS$^-$) the mercaptide of the alkali metal cation will in many cases precipitate into the aqueous phase. Accordingly the organic phase will contain only small amounts of mercaptan which remain unreactive and the aqueous phase will contain small amounts of mercaptide anion, dictated chiefly by the solubility product of the particular mercaptan selected. The mercaptans best suited for the extractant of this invention have very small solubility products and accordingly can be considered almost insoluble in water in their sodium or potassium mercaptide forms.

The presently preferred extractant for use in the cobalt and nickel winning process of the invention is disclosed in detail in U.S. application Ser. No. 831,501, filed on even date herewith, the disclosure of which is incorporated herein by reference. Other useable extractants are disclosed in U.S. application Ser. Nos. 831,552 and 831,553, filed on even date herewith, the disclosures of which are incorporated herein by reference.

Briefly, the preferred extractant (hereinafter referred to as the amine type) comprises a substantially water insoluble mercaptan solubilized together with a substantially water insoluble organic amine in a compatible water immiscible organic solvent. This type of mercaptide anion extractant depends on the ability of the amine to induce acid dissociation of the mercaptan so that mercaptide anions are produced in the organic solvent. The amine may be a secondary or preferably a tertiary amine wherein the nitrogen atom may be substituted with the same or different radicals. The mercaptans usable in this system may be essentially any mercaptan that is substantially water insoluble. Thus, the operable mercaptans include compounds having the formula RSH wherein R is selected from among cyclic, linear, or branched chain hydrocarbons, either substituted or unsubstituted aromatic compounds, and various amines and ketones. In the presence of the amine, the mercaptan undergoes acid dissociation to produce the mercaptide anion in the organic solvent and the amine is converted to a quaternary ammonium species. The identity of the organic solvent is not particularly significant, except insofar as it is capable of solvating the nickel and cobalt mercaptide produced. However, it is preferred that the solvent be a polar solvent or a solvent system which includes one or more polar solvents such as an alcohol.

As disclosed in U.S. application Ser. No. 831,553 another usable mercaptide anion extractant (hereinafter referred to as the alkali type) may be produced by solubilizing mercaptans of the type set forth above in an organic solvent system capable of solubilizing alkali metal ions, e.g., a relatively polar, water immiscible organic solvent having a high dielectric constant. If such a system is subjected to an aqueous alkaline solution containing KOH or NaOH, a two-phase neutralization reaction occurs resulting in mercaptide anion and alkali metal cations solvated in the organic phase. This extractant, in use, gives up alkali metal ions in exchange for the cobalt and/or nickel ions picked up.

Still another useful mercaptide anion extractant (hereinafter referred to as the aminothiol type) as disclosed in U.S. Ser. No. 831,552, comprises a substantially water immiscible organic solvent, preferably of polar character, containing a water insoluble compound of the general formula

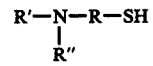

wherin R is a linking group, typically lower alkyl or aryl, and R' and R" are hydrogen, alkyl, aryl, etc. In the solvent, this type of mercaptan can undergo an internal proton shift to produce mercaptide anion:

The preferred mercaptans for use with this type of extractant are amino alkyl thiols and amides of thioglycolic acids.

If any of the foregoing types of mercaptide anion extractants are contacted with a cobalt and/or nickel containing aqueous solution, organic solvent soluble nickel and cobalt mercaptides are produced. In general, at the temperature of the extraction (usually 40°–70° C), there is a maximum possible metal loading in the organic phase in the range of 2–20 grams per liter of organic. For each mole of nickel or cobalt to be picked up in the organic phase, there should be at least two moles of RS$^-$ ion in the organic phase if the amine type extractant is used. In the case of the alkali or aminothiol type, at least about 2.5 moles of mercaptide anion should be present per mole of nickel or cobalt to be extracted. In all three types, the concentration of mercaptide anion may be up to the saturation point.

Some impurities often found in trace amounts in the pregnant liquors which can be treated with the extractant, e.g., cupric ions, are capable of oxidizing mercaptide anion to disulfide or forming complexes such as cuprous mercaptide. However, as disclosed below in accordance with the invention, the disulfides may be easily reduced back to mercaptide anion. Mercaptides of metals other than cobalt and nickel which are solubilized in the organic phase must be bled out of a cobalt or nickel recovery system, as otherwise they will build up.

The loaded extractant containing nickel and/or cobalt mercaptide can be stripped of its cobalt and nickel content by exposure to an aqueous alkaline solution, e.g., an NaOH, KOH, or Ca(OH)$_2$ solution, and carbon monoxide. Advantageously, stripping in this manner results in cobalt and nickel carbonyl compounds, typically gaseous nickel tetracarbonyl and water soluble carbonyl salts. As is known, these substances are easily converted to valuable nickel and cobalt compounds or to extremely pure nickel metal and cobalt of acceptable purity.

In accordance with the process of the invention, one of the economic considerations which should be taken into account in selecting an extractant is the the ease with which the loaded organic may be stripped. In this regard, while it has been observed that nickel and cobalt mercaptides, as a class, can be treated to produce nickel and cobalt carbonyls, different mercaptide anions and different types of extractants vary with respect to the concentration of alkali in the aqueous alkaline solution which is necessary to run the stripping reaction at an acceptable reaction rate. The amine and aminothiol types of mercaptide anion extractants set forth above have particular advantage over the alkali type in that carbonylate stripping can be achieved with solutions containing only 12 to 120 g/l sodium hydroxide or potassium hydroxide, and 50–160 g/l sodium carbonate. This is in contrast to the alkali solution required to strip the cobalt and nickel mercaptide loaded extractant of alkali type, wherein a solution comprising greater than 30% by weight sodium hydroxide was found to be required for reasonable reaction rates. Furthermore, the amine and aminothiol extractants can be stripped using carbon monoxide and an aqueous suspension of Ca(OH)$_2$ of about 40 g/l.

One economically desirable aspect of stripping the loaded extractant with carbon monoxide as disclosed above is that such treatment simultaneously regenerates the mercaptide anion, which is produced in its alkali metal salt form. This of course is ideal if the alkali extractant is being used. However, with respect to the other types, it is preferred to exchange hydrogen for the alkali metal cations prior to reusing the extractant, as otherwise alkali metal ions are lost to the cobalt and nickel-free raffinate. A hydrogen ion exchange can be effected by treating the alkali metal mercaptide containing organic with an aqueous acidic solution. The preferred method of exchange is to treat the solution with carbonic acid. Such treatment results in water soluble sodium carbonate from which NaOH can be regenerated by calcium oxide, thus conserving alkali.

Exemplary chemistry of the above-described processes is set forth below.

ALKALI TYPE

Extraction $2RSA \rightleftarrows 2RS^- + 2A^+$ $2RS^- + Ni^{++} \rightarrow (RS)_2Ni$ $2RS^- + Co^{++} \rightarrow (RS)_2Co$ wherein A is Na or K and RS$^-$ is the mercaptide anion.

Carbonylate Stripping $(RS)_2Ni + 5CO + 4NaOH \rightarrow Ni(CO)_4 \uparrow + 2RSNa + Na_2CO_3 + 2H_2O$ $2(RS)_2Co + 11CO + 12NaOH \rightarrow 2Na[Co(CO)_4] + 3Na_2CO_3 + 6H_2O + 4RSNa$

Caustic Regeneration $Na_2CO_3 + Ca(OH)_2 \rightarrow 2NaOH + CaCO_3 \downarrow$

Aminothiol Type

Extraction $RSH \rightleftarrows H^+RS^-$ $2H^+RS^- + Ni^{++} \rightarrow (RS)_2Ni + 2H^+$ $2H^+RS^- + Co^{++} \rightarrow (RS)_2Co + 2H^+$

Amine Type

Extraction $RSH + NR_3' \rightleftarrows (RS^- \text{---} R_3'NH^+)$ $2RS^- + Ni^{++} \rightarrow (RS)_2Ni$ $2RS^- + Co^{++} \rightarrow (RS)_2Co$ $R_3'NH^+ + OH^- \rightarrow R_3'N + H_2O$

AMINE AND AMINOTHIOL TYPE

Carbonylate Stripping $(RS)_2Ni + 5CO + 4NaOH \rightarrow Ni(CO)_4 \uparrow + 2RSNa + Na_2CO_3 + 2H_2O$ $2(RS)_2Co + 11CO + 12NaOH \rightarrow 2Na[Co(CO)_4] + 3Na_2CO_3 + 6H_2O + 4RSNa$ $(RS)_2Ni + 5CO + Ca(OH)_2 \rightarrow Ni(CO)_4 \uparrow + CaCO_3 \downarrow + 2RSH$

Extractant Regeneration $2RSNa + CO_2 + H_2O \rightarrow 2RSH + Na_2CO_3$

Caustic Regeneration $Na_2CO_3 + Ca(OH)_2 \rightarrow 2NaOH + CaCO_3 \downarrow$ A process which utilizes the above described organic, water immiscible extractant to recover cobalt and nickel metal will now be disclosed with reference to the drawing.

A solution containing cobalt and nickel ions, e.g., as cobalt and nickel ammines, is introduced through stream 10 into reactor 12. Organic extractant as set forth above is introduced into the same reactor through stream 14. The net result of the reaction taking place in reactor 12 is that cobalt and nickel values are essentially quantitatively removed from the aqueous phase and loaded into the organic phase. If the alkali type of extractant is used, alkali metal ions are exchanged for cobalt and/or nickel ions in reactor 12 and are lost through the aqueous raffinate when the phases are separated in liquid/liquid separator 18. However, when using the amine or aminothiol extractants, hydrogen ions are given up to the aqueous raffinate.

One of the primary advantages of the process of the instant invention is that the foregoing reactions can take place at or close to ambient temperatures and pressures. However, as is well known, solubility is a temperature dependent phenomenon. Accordingly, if desired, the process can be run at temperatures greater than 50° C. (e.g., up to 100° to 150° C). Furthermore, a pressure of 2 to 3 atmospheres is tolerable. That the reactions occur at moderate temperatures and pressures is important because no autoclaves need be employed.

In general, the pH of the cobalt and nickel containing solution introduced through stream 10 should not be below about 6.0 if the alkali extractant is used and should not be below about 3.5 for the other mercaptide extractants. In this regard, the optimum pH depends on the acid dissociation constant of the particular mercaptan selected. Thus, when the acid dissociation reaction is RSH ⇌ RS$^-$ + H$^+$, the acid dissociation contact K$_a$ will be:

$$K_a = RS^- H^+/RSH$$

Since RS$^-$ is responsible for the extraction and since, for a given mercaptan, K$_a$ is a constant, it is obvious that the hydrogen ion concentration will affect the RS$^-$ concentration. Accordingly, in general, the greater the H$^+$ concentration, the smaller will be the RS$^-$ concentration.

In the case of the alkali type extractant, mercaptide anion in the organic phase can react with hydrogen ions in the aqueous phase to produce organic solubilized mercaptans in accordance with the equation:

$$2RS^-_{(org)} + H^+_{(aq)} \rightleftharpoons RSH_{(org)}$$

Simultaneously, organic solubilized mercaptide anions and aqueous nickel or cobalt react to irreversibly form nickel and cobalt mercaptides in accordance with the following reactions:

As can be seen from the foregoing, both hydrogen and metal ions will be in competition for the mercaptide anion. Accordingly, at some relatively low pH, the nickel and cobalt extraction will become impractical.

In the case of the aminothiol extractants, the extraction is operable at much lower pH than is possible with the alkali metal mercaptide salts. This is because the aminoethanethiols, etc. have a relatively high acid dissociation constant. The addition of an amine in the solvent carrier of this species of extractant will adapt the extractant for use on pregnant liquors of lower pH.

In the case of the amine extractants, the extraction is possible at even lower pH because of the presence of organic amines of high basicity in the organic phase. A slightly different mechanism than disclosed above applies here. Specifically, there is a dissociation in the organic phase as well as a hydrolysis of the quaternary ammonium ions which regenerates the organic soluble amine. In all of the above situations, once nickel or cobalt mercaptide is formed, it is removed from the equilibria and the process continues although at a slower rate.

After the cobalt and nickel values have been extracted in the organic phase, both phases are delivered via stream 16 to a liquid-liquid separator 18. There, the aqueous raffinate containing for example solubilized ammonia, ammonium ions, the anions formerly associated with the cobalt and nickel and alkali metal ions or the additional hydrogen ions (depending on the extractant employed) is removed as a metal-free raffinate and recycled to dissolve more metal values. The nickel and cobalt loaded organic phase is then transferred via stream 20 to a second reactor 22 wherein the carbonylate stripping takes place.

In reactor 22, a carbon monoxide containing gas, preferably pure CO or synthesis gas, and an aqueous alkaline solution containing an alkali metal hydroxide (MOH where M is an alkali metal), are intimately contacted with the metal loaded organic phase. Carbonyl compounds of cobalt and nickel are produced.

It should be noted that the aqueous phase must be basic in order to promote the foregoing reaction. Thus, a base such as NaOH, KOH, Ca(OH)$_2$, etc. (if desired, containing a buffer such as Na$_2$CO$_3$, etc.) will be required. The optimum alkali concentration in the aqueous solution introduced into reactor 22 will, in a manner similar to that set forth above, depend upon the particular mercaptide selected. For purposes of economy, it is preferred to employ an extractant that is easily stripped with a relatively low alkali concentration. It should also be noted that it is not critical that all nickel and cobalt be removed from the organic phase. Less than quantitative stripping is tolerable because the extractant may be reloaded by difference. However, for obvious reasons, as much cobalt and nickel as possible should be stripped. All oxygen should be excluded from reactor 22.

As can be seen from the above, nickel tetracarbonyl and tetracarbonyl cobaltate ions are produced in reactor 22. Advantageously, nickel tetracarbonyl is a gaseous compound which may be removed from the reaction together with excess carbon monoxide. Normally, there will be no other metal present which can form gaseous compounds under the conditions in reactor 22. Consequently, the nickel carbonyl, if subsequently broken down into nickel metal and carbon monoxide, produces an extremely pure nickel product. As is known in the art, nickel tetracarbonyl in the carbon monoxide off-gas stream 23 can be concentrated, e.g., condensed under pressure or absorbed into a suitable solvent such as the type disclosed in U.S. Pat. No. 3,688,474 to M. D. Head et al. Once concentrated in reactor 25, the nickel carbonyl is easily thermally decomposed in reactor 25' to pure nickel metal which exits via stream 27 and carbon monoxide gas which may be recycled via stream 29.

The tetracarbonyl cobaltate formed during the carbonylate stripping of cobalt from the organic phase in reactor 22 is soluble in the alkaline aqueous phase but insoluble in the organic phase. Accordingly, cobalt values in aqueous solution may be isolated from the organic phase by means of a liquid-liquid separation in separator 24. The separation enables substantially all of the tetracarbonyl cobaltate ion to be delivered as an aqueous phase through stream 26 to reactor 28. The organic phase containing the mercaptide extractant, but essentially no cobaltate or nickel carbonyl, is transported for recycle through stream 30.

Inevitably, aqueous stream 26 will contain small amounts of mercaptide anion even though the mercaptide anion useful in the extractant are substantially water insoluble. Since, in relative terms, mercaptide anion is more soluble in water than its corresponding mercaptan, the higher the alkalinity of the aqueous solution, the greater the amount of mercaptide solubilized therein. If the organic solvent contains a highly basic compound such as water insoluble amine as preferred, more mercaptide anion will be kept in the organic phase. Thus, the quantity of mercaptide that will pass into the aqueous stream 26 depends on the identity of the mercaptan selected, the alkalinity of the aqueous solution, the composition of the organic solvent, and the organic to aqueous ratio in reactor 24. Over a period of time, mercaptide anion lost in this way would represent a significant expense. However, in accordance with another aspect of the invention, this mercaptide anion may be recovered as indicated hereinafter.

Stream 30 contains the alkali metal salt of the mercaptide extractant. If alkali type extractant is being employed, these sodium or potassium ions are necessary in order to ensure that the anion will be present in the extractant. Accordingly, the sodium or potassium mercaptide salt solubilized in the organic solvent may be delivered via stream 32 and stream 14 to reactor 12 for reuse. However, when the amine or aminothiol extractants are employed, in order to conserve alkali metal ions, the organic extractant is preferably delivered to reactor 34 for ion exchange with hydrogen. Thus, depending on the particular mercaptide selected, the organic phase exiting from reactor 24 may be delivered directly to reactor 12 or may be treated to exchange hydrogen for the alkali metal.

In the latter case, the organic stream 30 leads to a reactor 34 which also receives an aqueous acidic solution. On mixing of the phases, a neutralization reaction occurs whereby the alkali metal salt of the particular acid selected is solubilized in the aqueous phase. Suitable acids include HCl and $H_2SO_4$. However, the preferred acid is carbonic acid, that is, a solution of carbon dioxide in water. In this situation the following reaction occurs:

$$2RSM + CO_2 + H_2O \rightarrow 2RSH + M_2CO_3$$

wherein M is NA or K. After the exchange, both phases are delivered through stream 36 to liquid-liquid separator 38. The aqueous phase containing the alkali metal salt, preferably $Na_2CO_3$, is thereby removed from the organic extractant. The mercaptide ion now associated with hydrogen is delivered to reactor 12 for reuse via stream 14.

Aqueous stream 39, if the preferred carbonic acid is used, will contain alkali metal carbonate. This may be introduced into the system at some point prior to reactor 46 where regeneration into alkali metal hydroxide can take place with calcium oxide in accordance with the reaction:

$$Na_2CO_2 + CaO + H_2O \rightarrow 2NaOH + CaCO_3$$

$$K_2CO_3 + CaO + H_2O \rightarrow 2KOH + CaCO_3$$

As indicated above, the aqueous phase exiting from the reactor 24 via stream 26 will contain carbonyl cobaltate anion and an alkali metal hydroxide. While several methods of isolating cobalt metal or useful cobalt compounds from an aqueous cobaltate solution are known, a preferred cobalt treatment comprises oxidizing the cobaltate in reactor 28 with air, ferric ions, etc., to form water insoluble cobalt carbonyl compounds such as $Co_2(CO)_8$, $Co_4(CO)_{12}$, $Co_6(CO)_{16}$, etc., and ultimately to hydrated cobalt oxide, according to reactions of the type:

$$4Co(CO)_4^- + O_2 + 2H_2O \rightarrow 2Co_2(CO)_8 + 4OH^-$$

A slurry of insoluble cobalt compounds and an aqueous solution containing, among other things, carbonate ions produced during the carbonylate stripping reaction in reactor 22, is then delivered through stream 40 into liquid-solid separator 42. The cobalt compounds which, in general, are believed to have the formula: $Co_x(CO)_{2x+4}$ where $x$ is 2, 4, 6, etc., can then be treated as desired, e.g., thermally decomposed in a known manner to produce cobalt metal.

As indicated above, a certain amount of mercaptide anion is delivered to reactor 28 via stream 26 together with the aqueous phase. When subjected to the oxidizing conditions in reactor 28, the mercaptide anion will be oxidized to disulfide in accordance with the reaction:

$$2RS^- + 1/2O_2 + H_2O \rightarrow RSSR + 2OH^-$$

The disulfide formed is much more insoluble in water than the corresponding mercaptide anion. Accordingly, the solid disulfide will be carried with the solid cobalt compounds into separator 42 where they are separated from the aqueous solution together with the cobalt values. Thus, solid stream 50 will contain some disulfide.

Figure 2:
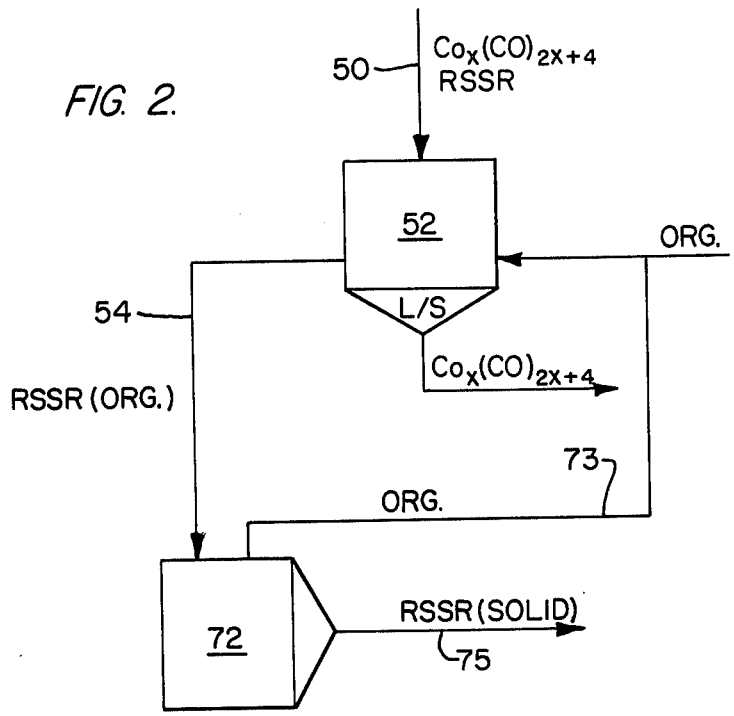
FIG. 2 is a schematic diagram illustrating a first method of recovering disulfides produced in the process of FIG. 1 and reducing them to mercaptide anions.
Figure 3:
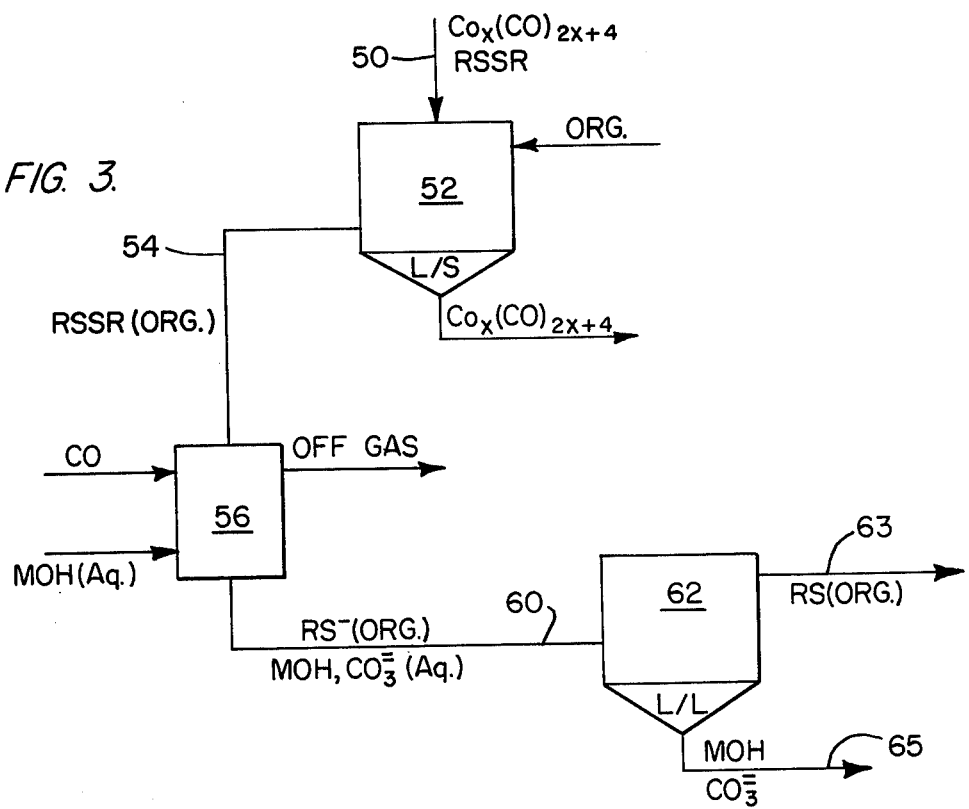
FIG. 3 is a schematic diagram illustrating a second disulfide recovery system useful with the process of FIG. 1.

FIGS. 2 and 3 disclose alternative processes for recovering the disulfide as active mercaptide anion extractant. Referring to FIG. 2, solid stream 50 is washed at 52 with a suitable organic solvent which will selectively dissolve the disulfide. A subsequent liquid-solid separation isolates the cobalt values and the organic solubilized disulfide exits via stream 54 to be crystalized at 72. If the wash solvent employed is a volatile solvent such as methanol, acetone, various ethers, etc., having the solution at 72 will cause the vapor to be driven off and recycled via stream 73. Substantially pure disulfide crystallizes in container 72 and exits via stream 75 to be introduced in the main organic extractant stream so that it ultimately enters reactor 22. In this case, the disulfide will be reduced to mercaptide during the carbonylate stripping in reactor 22 according to the reaction:

$$RSSR + CO + 4NaOH \rightarrow 2RSNa + Na_2CO_3 + 2H_2O$$

FIG. 3 discloses an alternative method of retrieving the disulfide which is preferred over the method of FIG. 2. In a manner similar to that described above, the disulfide entering 52 via stream 50 is separated from the cobalt values and exits as an organic phase via stream 54. Unlike the procedure disclosed above, the organic carrying the disulfide is then introduced into a reactor 56 which, in a manner similar to reactor 22, is fed with carbon monoxide and an aqueous alkaline solution. Under these conditions, the disulfides are converted to mercaptide anions which are solvated in the organic phase, which preferably employs the same solvent as in the carrier in the main system. The organic phase together with the aqueous phase carrying carbonate ions and alkali is then delivered via stream 60 to liquid-liquid separator 62. There, the organic and aqueous phases are separated and the organic phase is delivered via stream 63 back into the main stream, e.g., together with the extractant makeup. The aqueous phase from separator 62 may be delivered via stream 65 to stream 48 for reuse.

Referring again to FIG. 1, the cobalt free aqueous phase which is separated in liquid-solid separator 42 is delivered via stream 44 to a reactor 46, wherein all excess carbonates are removed by calcium oxide with simultaneous regeneration of alkali metal hydroxide. The aqueous phase may then be delivered via stream 48 to the carbonylate stripping reactor 22 for reuse.

From the foregoing, it will be apparent to those skilled in the art that many modifications of the procedure set forth above may be made without departing from the scope of the instant invention. Perhaps most notably, it is contemplated that alternative cobalt and nickel metal isolation and purification techniques may be employed, and many other methods of preparing the alkali metal hydroxide for recycle may be used.

The Invention will be further understood from the following non-limiting examples.

EXAMPLE 1

A. Preparation of Extractant

An organic extractant solution was prepared at 54° C under an inert (argon) atmosphere by mixing together 17.84 ml of α-toluenethiol, 80 xylene, 80 ml kerosene, and 40 ml decanol. This organic solvent must be activated with an aqueous alkaline solution before it is capable of extracting nickel or cobalt values. Accordingly, an NaOH solution, saturated at 10° C below the operating temperature of the extractant (i.e. about 44° C), was prepared and mixed with the organic phase (2:1 to 4:1 by volume organic to aqueous) under an inert atmosphere. After allowing the phases to separate, the aqueous phase was removed. The organic phase contained the sodium salt of α-toluenethiol and was ready for use as an extractant.

B. Extraction

The extraction was effected by preliminarily mixing 60 ml of the organic extractant with 5 ml of decanol, and thereafter mixing the 65 ml of organic with 75 ml of an ammoniacal nickel solution (9.937g/l) at 54° C under a non oxidizing atmosphere. Within about 15–30 seconds, the extraction of nickel from the aqueous to the organic phase reaches equilibrium. After separating the phases, the nickel content of the organic phase was assayed by destroying the mercaptide with aqua regia, separating the organic phase, and determining the nickel content of the aqueous phase by atomic absorption. The organic phase was determined to have had 11.45g/l Ni content.

Carbonylate Stripping

The loaded organic is carbonylate stripped in a carbonylation reactor consisting of a temperature controlled, 4 necked flask equipped with a magnetic stirrer. An aqueous alkaline solution and the loaded organic phase are placed together in the flask. To achieve good three phase mxing, a dip tube fitted with a peristaltic pump is used to withdraw a two phase mixture from the flask, carbon monoxide free of oxygen or carbon dioxide is introduced downstream of the pump, and the three phase mixture is reintroduced into the flask via a jet (orifice diameter 1–2mm). The circulation flow rate is adjustable between about 150 to 800 ml/min. A trap was used to collect condensation in the off gas and return it to the flask. The carbon monoxide off-gas carrying the product of reaction, $Ni(CO)_4$, is passed through two parallel scrubbing trains (in turn) in order to destroy the carbonyl. The first two traps in each series were filled with $HNO_3/H_2O$ (3:1), the last one with aqua regia. The amount of $Ni(CO)_4$ produced versus time is determined by atomic absorption (of Ni) of the scrubbing solution in one of the scrubbing trains while the gas was diverted to the alternate parallel train. Carbonylate stripping yield is calculated by reporting the amount of nickel present in the traps to the amount of nickel initially present in the loaded organic phase. The cobalt yield of the carbonylate stripping reaction is calculated by reporting the cobalt found (by atomic absorption) in the alkaline aqueous stripping solution after completion of the reaction and separation of the phases.

Twenty-six ml of the nickel loaded organic produced in B were stripped as described above employing approximately 1 atm. of CO and a saturated (at 30° C) aqueous MOH solution. The volume ratio of the organic to aqueous phases was 0.7, and the reaction was conducted at 49° C. After 2½ hours, 28 ml of aqueous phase were removed and replaced with fresh solution. After an additional 65 minutes, 22 ml of the aqueous phase were again replaced. After 30 more minutes (total reaction time 245 min.) 95.5% of the nickel originally present in the loaded organic had been removed as carbonyl.

In the following examples, the procedure and materials used are the same as those indicated above unless otherwise specified.

EXAMPLE 2

A. Preparation of Extractant

The extractant was prepared as set forth in Example 1, part A.

B. Extraction

The extraction was effected by mixing 80 ml of the extractant with 25 ml of an aqueous nickel and cobalt containing solution for 15 minutes at 46° C. The solution contained 11g/l Ni and 1.6 g/l Co, as $NiSO_4$ and $CoSO_4$, $(NH_4)_2SO_4$, and ammonia, pH 10.5. After extraction, the organic phase contained 10.433 g/l Ni and 1.769 g/l Co.

C. Carbonylate Stripping

The stripping was conducted using the procedure and apparatus set forth in Example 1, part C. However, the aqueous solution used to prepare the extractant in Example 2, part A, saturated with KOH at 40° C, was used as the aqueous alkaline stripping solution. 37 ml of the alkaline solution were mixed with 25 ml of loaded organic and stripped under about 1 atm CO at 49°–50° C for 2.5 hours. After separation of the aqueous and organic phases, nickel and cobalt content reported as follows:

| Phase | Yield |
|---|---|
| Aqueous | 26.1% Co (.312 g/l) |
| | .58 g/l Ni |
| Gas | 79.2% Ni |
| | 0.0% Co |

Fifteen ml of a partially stripped organic phase obtained in the manner set forth immediately above were mixed with 14 ml of the aqueous metal containing ammoniacal solution described in part B (above). At the completion of the reaction, the organic phase contained 10.110 g/l Ni and 1.563 g/l Co, thereby demonstrating that the organic extractant may be reloaded by difference.

The aqueous alkaline stripping solution set forth above (after carbonylate stripping and phase separation, 37 ml vol. containing 0.01156 g Co and 0.02146 g Ni) was placed in a breaker and left in contact with air for 48 hours at room temperature. The solid precipitate which formed was filtered, dissolved in $H_2NO_3/HCl/H_2SO_4$, and analyzed for Ni and Co. The filtrate was also analyzed. 96.5% of the nickel and 23.6% of the cobalt in the alkaline stripping solution was present in the solids.

EXAMPLE 3

A. Preparation of Extractant

An extractant was prepared as set forth in Example 1, part A, except that it consisted of 6.75 ml dodecanethiol, 35 ml decanol, and 15 ml of kerosene. This organic solution was then mixed with a solution of 4.4g KOH in 20 ml $H_2O$ at 65° C, and the phases separated.

B. EXTRACTION 5 ml of the organic extractant were mixed with 20–25 ml of an ammoniacal nickel solution (approx. 10 g/l Ni, pH = 10.5) at 65° C. The two phase mixture was stirred under argon. The organic phase turned dark brown, indicating extraction of Ni.

The portion of extractant not used in the reaction set forth above (approx. 52 ml) was allowed to oxidize in air overnight at 60° C, with stirring. Mercaptide anion in the extractant was oxidized to a disulfide:

$$2RS^- \rightarrow RSSR$$

Five ml of the oxidized organic extractant were then mixed with a 20–25 ml portion of the 10 g/l nickel solution described above. However, no color change occurred, indicating that the disulfide could not extract nickel. To regenerate the extractant, 25 ml of the disulfide containing organic were reduced with CO in the presence of 25 ml of saturated (at 40° C) KOH solution for 1 hour. After separation of the phases, 5 ml of the regenerated organic were added to 20–25 ml of the 10 g/l nickel solution. The change in color observed indicated that nickel stripping was occurring.

EXAMPLE 4

A. Preparation of Extractant

A four component extractant was prepared under argon by mixing 2.4 g thionalid, 8.6 ml decanol, 15 ml methanol, and 15.4 ml of an organic amine (Adogen 382, Ashland Co.).

B. Extraction

The extractant was then mixed with 75.0 ml of an ammoniacal (pH = 10.8) nickel solution (3.8 g/l Ni) at a temperature of 60° C. After separation of the phases, the organic reported at 4.43 g/l Ni.

C. Carbonylate Stripping

Twenty ml of the nickel loaded organic solution were carbonylate stripped at 50° C with 30 ml of an aqueous alkaline solution comprising 24 g/l NaOH and 150 g/l $Na_2CO_3$ for one hour. 25.2% of the nickel was recovered as nickel carbonyl.

EXAMPLE 5

A. Preparation of Extractant

An extractant was prepared comprising 2.81 ml of 2 - N - decylaminoethanethiol, 7.5 ml decanol, 15.0 ml kerosene, and 4.7 ml xylene.

B. Extraction

Thirty ml of the extractant were mixed with 77 ml of the nickel solution of Example 4, part B at 40° C. An organic solution containing 9.72 g/l Ni resulted.

C. Carbonylate Stripping

Twenty ml of the loaded organic were stripped with CO and 30 ml of aqueous alkaline solution (40 g/l NaOH, 200 g/l $Na_2CO_3$), at 50° C for 1 hour. 35.4% of the available nickel reported as nickel carbonyl.

EXAMPLE 6

A. Preparation of Extractant

The extractant of this example comprised 2.81 ml 2 - N - decylaminoethanethiol, 8.75 ml decanol, 2.50 ml xylene, and 10.90 ml of an organic amine (Adogen 364, Ashland Co.).

B. Extraction

Twenty-five ml of the extractant were mixed with 75 ml of a 3.8 g/l ammoniacal Ni solution. The organic phase reported at 7.03 g/l Ni.

C. Carbonylate Stripping 1. 20 ml of the nickel loaded organic were stripped with CO and 30 ml of aqueous solution containing 38.5 ml of a 29.5% $NH_3$ solution per liter of solution (density approx. 0.877 g/l) and 133.3 g/l $(NH_4)_2CO_3$. The stripping reaction was conducted for 90 minutes at 50° C. 7.33% of the nickel reported as carbonyl.

2. Twenty ml of the nickel loaded organic were stripped with CO and 40 ml of a $Ca(OH)_2$ suspension (28.7 g/l $Ca(OH)_2$). The stripping reaction was conducted for 2 hours at 50° C. 33.1% of the nickel reported as carbonyl.

EXAMPLE 7

A. Preparation of Extractant

The extractant of this example was a solution containing (by volume) 2.04% 2 - N - decylaminoethanethiol, 86.83% decanol, 2.93% organic amine (Primene JMT, Rohm & Haas), and 8.19% organic amine (Adogen 382, Ashland Co.).

B. Extraction

A cobalt solution was prepared by adding 0.84 ml of a concentrated cobalt sulfate stock solution (62.5 g/l $Co^{++}$) to 24.16 ml of nickel and copper free ammoniacal solution containing $NH_3$, $NH_4+$, $CO_3^=$ and trace amounts of $Cl^-$ and $Na^+$, resulting in a 2.10 g/l $Co^{++}$ solution. Sufficient quantities of the organic extractant and cobalt solution were mixed such that, per mole of Co++ in the aqueous phase, there were 2.4 moles of the 2 - N - decylaminoethanethiol. Extraction at 50° C resulted in a 1.29 g/l cobalt content in the organic phase.

C. Carbonylate Stripping

Twenty ml of the loaded organic were stripped with CO and an aqueous phase containing 40 g/l NaOH and 128 g/l $Na_2CO_3$. After 90 minutes, 16.2% of the cobalt reported in the aqueous phase is $Co(CO)_4^-$.

I

EXAMPLE 8

A. Preparation of Extractant

The extractant was prepared by mixing 6.43 ml of 2 — (P — fluoroanilino) — ethanethiol, 39.70 ml decanol, 43.70 ml of the amine Adogen 364, and 10.02 ml xylene.

B. Extraction

Twenty-five ml of the extractant were mixed with 70 ml of an ammoniacal nickel solution (Ni = 3.8 g/l, pH = 10.8) at 60° C. The two phase mixture was stirred vigorously for 2 hours under argon, resulting in an organic phase containing 2.57 g/l nickel.

C. Carbonylate Stripping

Twenty ml of the loaded organic were stripped for 85 minutes with CO at 62° C using 30 ml of an aqueous alkaline solution containing 40 g/l NaOH and 150 g/l $Na_2CO_3$. The nickel reporting as $Ni(CO)_4$ comprised 11.3 % of the total available in the loaded organic.

EXAMPLE 9

A. Preparation of Extractant

The extractant comprised an organic solutio consisting of (by volume) 12.78% 2 — N — decylaminoethanethiol, 37.34% N, N - diethylcyclohexylamine, 38.99% decanol, and 10.89% xylene.

B. Extraction

A nickel solution containing 3.8 g/l Ni, of the type set forth in Example 4, part B, and the extractant set forth above were mixed such that the mole ratio of the thiol in the extractant to the nickel in the solution was 3.20. At a temperature of 50° C, organic nickel loading reported at 11.3 g/l.

C. Carbonylate Stripping

Twenty ml of the nickel loaded organic were stripped at 55° C for one hour with an alkaline solution containing 40 g/l NaOH and 128 g/l $Na_2CO_3$. The nickel recovered as $Ni(CO)_4$ represented 30.8% of the total available.

Copper or iron ions, if present in the pregnant liquors compete with nickel and cobalt for association with the mercaptide ion in the extractant. Copper is not stripped by carbon monoxide and accordingly, would have to be bled out. Iron, in general, is believed to follow the cobalt chemistry. There are many known methods of separating iron and cobalt carbonyl.

The invention may be embodied in other specific forms without departing from the spirit and essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A process for separating compounds of a metal selected from the group consisting of cobalt and nickel from an aqueous solution containing at least one of said metals, said process comprising the steps of:
   A. providing an extractant comprising a water immiscible organic solvent containing solubilized mercaptide anion capable of reacting with cobalt and nickel to form water insoluble mercaptides;
   B. contacting the extractant with the aqueous solution to produce a mercaptide selected from the group consisting of nickel mercaptide, cobalt mercaptide, and mixtures thereof in said extractant;
   C. separating the aqueous raffinate solution resulting from step B from the mercaptide loaded extractant;
   D. contacting the extractant containing the mercaptide with an aqueous alkaline solution and carbon monoxide to strip cobalt and nickel values therefrom and to produce at least one compound selected from the group consisting of gaseous nickel tetracarbonyl and water soluble carbonyl cobaltate salts; and
   E. separating the nickel carbonyl and carbonyl cobaltate from the extractant.

2. The process as set forth in claim 1 wherein the aqueous metal containing solution contacted in step B is a mixed solution of nickel and cobalt values, said process further comprising the step of:
   partitioning the carbonyl cobaltate from the nickel carbonyl produced in step D by separating the gaseous reaction products containing nickel carbonyl from the aqueous alkaline solution.

3. The process as set forth in claim 1 wherein the aqueous metal containing solution is a non-ammoniacal solution containing at least one water soluble salt selected from the group consisting of nickel salts and cobalt salts.

4. The process as set forth in claim 1 wherein the aqueous metal containing solution is an ammoniacal solution.

5. The process as set forth in claim 1 wherein the aqueous solution separated in step C is recycled to solubilize metal values.

6. The process as set forth in claim 1 comprising the further step of recycling the extractant solution separated in step E to step B.

7. The process as set forth in claim 6 wherein, in step D, alkali metal mercaptide is produced in the extractant and the alkali metal ion of said mercaptide is replaced by hydrogen ion prior to reuse of the extractant in step B.

8. The process as set forth in claim 7 wherein the alkali metal ion is replaced by hydrogen by contacting the organic extractant with an aqueous solution containing a member selected from the group consisting of $H_2CO_3$, $CO_2$, and another mineral acid.

9. The process as set forth in claim 6 wherein, in step D, the aqueous alkaline solution contains $Ca(OH)_2$, and the mercaptide is converted to a mercaptan.

10. The process as set forth in claim 1 wherein the water soluble carbonyl cobaltate salts produced in step D are solubilized in the aqueous alkaline solution, said process comprising the further steps of:

separating the aqueous alkaline solution from the extractant;

oxidizing the $Co(CO)_4^-$, in situ, to produce water insoluble cobalt carbonyls; and separating the water insoluble cobalt carbonyls from the aqueous alkaline solution.

11. The process as set forth in claim 10 wherein said separated water insoluble cobalt carbonyls are decomposed to produce cobalt metal.

12. The process as set forth in claim 10 wherein mercaptide anion is present in the aqueous alkaline solution and water insoluble disulfides are produced in the oxidizing step, said process comprising the steps of:

extracting the disulfides with an organic solvent;

reducing the disulfides with carbon monoxide in the presence of an aqueous alkaline solution to produce mercaptide anion; and recycling the mercaptide ion to step A.

13. The process as set forth in claim 12 wherein the organic solvent used to extract the disulfide is a volatile solvent, the volatile solvent is separated from the disulfide to crystallize the disulfide, and the crystalline disulfide is recycled by being added to step D.

14. The process as set forth in claim 12 wherein the disulfide is reduced to alkali metal mercaptide, and prior to recycling, the alkali metal mercaptide is contacted with an acid to produce mercaptan.

15. The process as set forth in claim 1 comprising the further step of concentrating the gaseous nickel carbonyl produced in step D, decomposing the nickel carbonyl to form nickel and carbon monoxide, and recycling the carbon monoxide.

16. A process for separating cobalt and nickel values from an aqueous solution containing ions of said metals, said process comprising the steps of:

A. providing an extractant comprising a water immiscible organic solvent containing solubilized mercaptide anion capable of reacting with cobalt and nickel to form water insoluble mercaptides;

B. contacting the extractant with the aqueous solution to produce a mixture of cobalt mercaptide and nickel mercaptide in said extractant;

C. separating the aqueous raffinate solution resulting from step B from the mercaptide loaded extractant;

D. contacting the extractant containing the mercaptides with an aqueous alkaline solution and carbon monoxide to strip cobalt and nickel values therefrom and to produce gaseous $Ni(CO)_4$ and a water soluble salt of carbonyl cobaltate;

E. separating the metal depleted extractant produced in step D and recycling the extractant to step B;

F. isolating the nickel carbonyl gas produced in step D and decomposing the nickel carbonyl to produce substantially pure nickel metal and carbon monoxide; and G. isolating an aqueous phase containing carbonyl cobaltate salts produced in step D and oxidizing the carbonyl cobaltate to water insoluble cobalt carbonyl compounds.

17. The process as set forth in claim 16 including the further step of recycling the carbon monoxide produced in step F to step D.

18. A process for producing at least one compound selected from the group consisting of carbonyl cobaltate salts and nickel carbonyl compounds from aqueous solutions of a metal selected from the group consisting of cobalt and nickel, said process including the steps of:

extracting at least one of said metals from the aqueous solution into an extractant comprising a water immiscible organic solvent and mercaptide anion to load the organic extractant with substantially water insoluble metal mercaptide; and stripping the metal loaded extractant of metal values by contacting it with carbon monoxide in the presence of an aqueous alkaline solution to produce at least one compound selected from the group consisting of water soluble carbonyl cobaltate compounds and gaseous nickel carbonyl compounds.

* * * * *